(12) United States Patent
Fagerberg et al.

(10) Patent No.: US 10,746,325 B2
(45) Date of Patent: Aug. 18, 2020

(54) INSERT HALF, AND INSERT BLOCK COMPRISING TWO OF SAID INSERT HALVES

(71) Applicant: MCT Brattberg AB, Karlskrona (SE)

(72) Inventors: Johan Fagerberg, Karlskrona (SE); Anders Karlsson, Karlskrona (SE)

(73) Assignee: MCT BRATTBERG AB, Karlskrona (SE)

( * ) Notice: Subject to any disclaimer, the term of this patent is extended or adjusted under 35 U.S.C. 154(b) by 0 days.

(21) Appl. No.: 16/091,661

(22) PCT Filed: Apr. 5, 2017

(86) PCT No.: PCT/SE2017/050339
§ 371 (c)(1),
(2) Date: Oct. 5, 2018

(87) PCT Pub. No.: WO2017/176203
PCT Pub. Date: Oct. 12, 2017

(65) Prior Publication Data
US 2019/0154172 A1    May 23, 2019

(30) Foreign Application Priority Data
Apr. 5, 2016  (SE) ........................................ 1650465

(51) Int. Cl.
*H02G 3/22* (2006.01)
*F16L 5/08* (2006.01)
*F16L 5/14* (2006.01)
(52) U.S. Cl.
CPC .................. *F16L 5/08* (2013.01); *H02G 3/22* (2013.01); *F16L 5/14* (2013.01)
(58) Field of Classification Search
CPC ................ F16L 5/04; A62C 2/06; H02G 3/08
(Continued)

(56) References Cited

U.S. PATENT DOCUMENTS 4,919,372 A *  4/1990  Twist ........................ F16L 5/14
                                                                    248/56
6,193,195 B1 *  2/2001  Owens .................. F16L 3/2235
                                                                   248/68.1
(Continued)

FOREIGN PATENT DOCUMENTS

EP        1134472 A2    9/2001
GB        2186440 A     8/1987
(Continued)

OTHER PUBLICATIONS

International Search Report corresponding International application PCT/SE2017/050339, dated Jun. 14, 2017, 4 pages.
(Continued)

*Primary Examiner* — Patrick F Brinson
(74) *Attorney, Agent, or Firm* — Cooper Legal Group, LLC; Ronald M. Kachmarik

(57) ABSTRACT

Insert half for sealing around a cable, pipe or wire. The insert half includes a body with a first and a second end, a first side intended to be arranged towards a corresponding first side of a substantially identical insert half, and a groove arranged in the first side and extending between the first and second end along an axis A. A number of recesses extending transverse to axis A are formed in the groove along axis A. At least one insert is removably arranged within the groove. The insert is formed by at least two elements bonded to each other and arranged side by side along axis A. The insert has an outside shape corresponding to the shape of the groove and the recesses such that the insert could be arranged anywhere along the groove. Each element includes a semi-circular passage with different radius co-axial to axis A.

14 Claims, 6 Drawing Sheets

(58) Field of Classification Search
USPC .... 138/106; 174/650, 653, 156, 481, 152 G, 174/153 G; 248/56, 68.1, 67.5
See application file for complete search history.

(56) References Cited

U.S. PATENT DOCUMENTS

| | | | | |
|---|---|---|---|---|
| 6,590,160 | B1 * | 7/2003 | Dopfl | F16L 5/04 |
| | | | | 174/152 G |
| 6,902,138 | B2 * | 6/2005 | Vantouroux | F16L 3/1091 |
| | | | | 248/68.1 |
| 8,541,699 | B2 * | 9/2013 | Milton | H02G 3/22 |
| | | | | 174/659 |
| 9,528,636 | B2 * | 12/2016 | Beele | F16L 5/10 |
| 2012/0071029 | A1 | 3/2012 | Millevik | |
| 2012/0266409 | A1 | 10/2012 | Andersson et al. | |
| 2013/0113166 | A1 | 5/2013 | Hjerpe | |
| 2016/0281884 | A1 * | 9/2016 | Johansson | H02G 3/22 |

FOREIGN PATENT DOCUMENTS

| | | |
|---|---|---|
| GB | 2204922 A | 11/1988 |
| WO | 02/37634 A1 | 5/2002 |
| WO | 2007/094736 A1 | 8/2007 |
| WO | 2008069716 A1 | 6/2008 |
| WO | 2015/065256 A1 | 5/2015 |

OTHER PUBLICATIONS

European Search Report from corresponding European Application 17779445.0 dated Oct. 22, 2019, 6 pages.

* cited by examiner

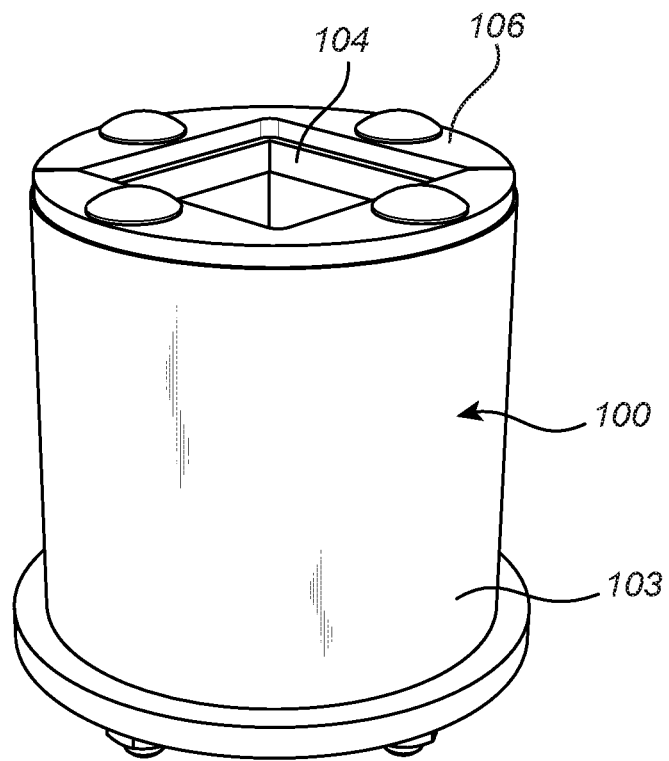
Fig. 2
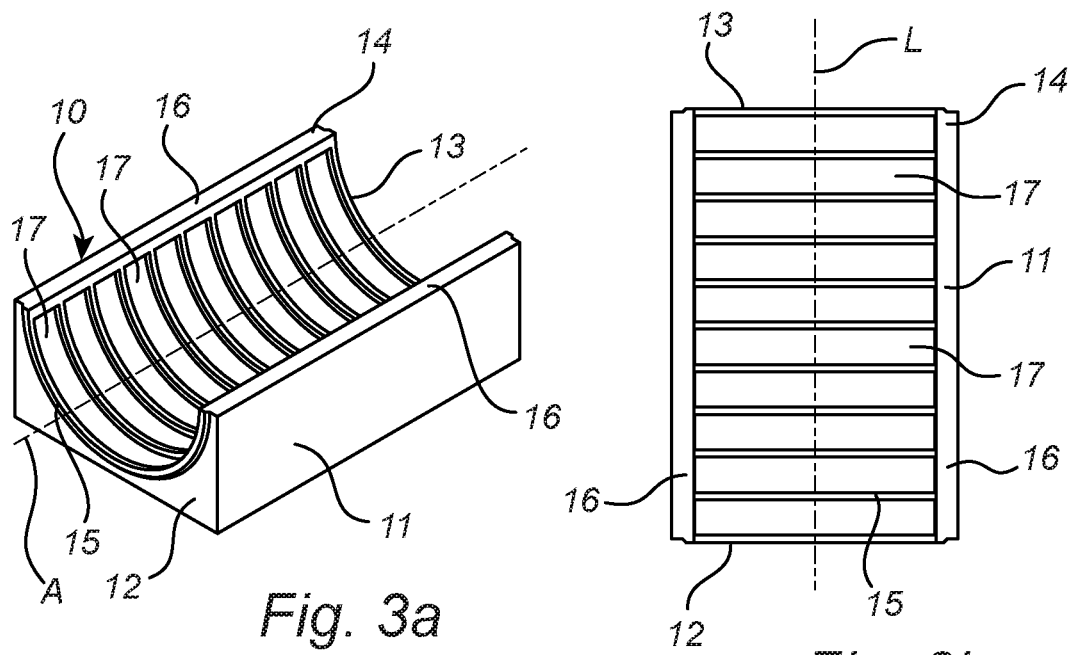
Fig. 3a
Fig. 3b

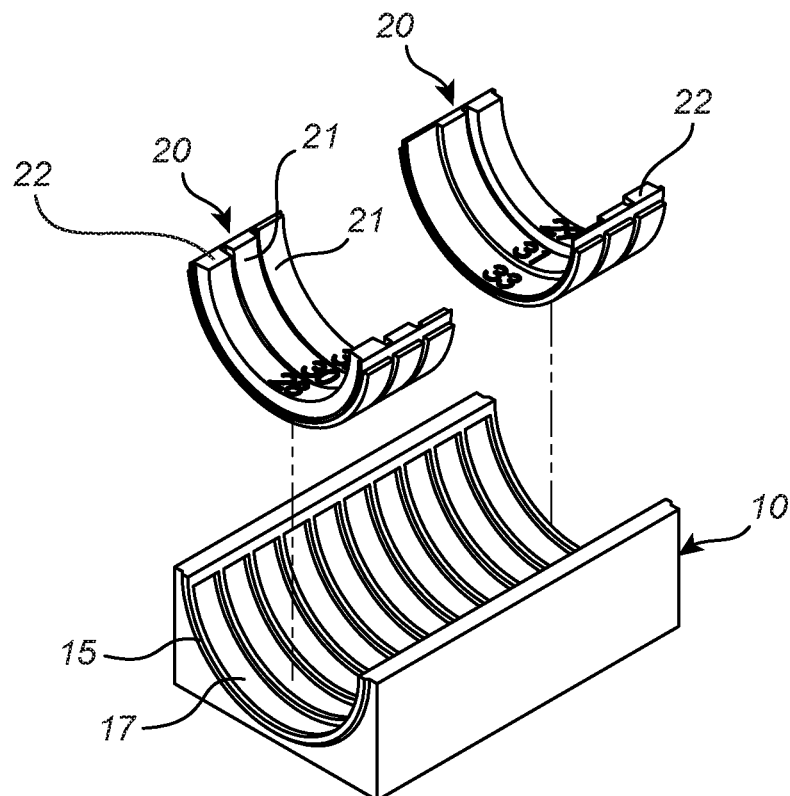
Fig. 4
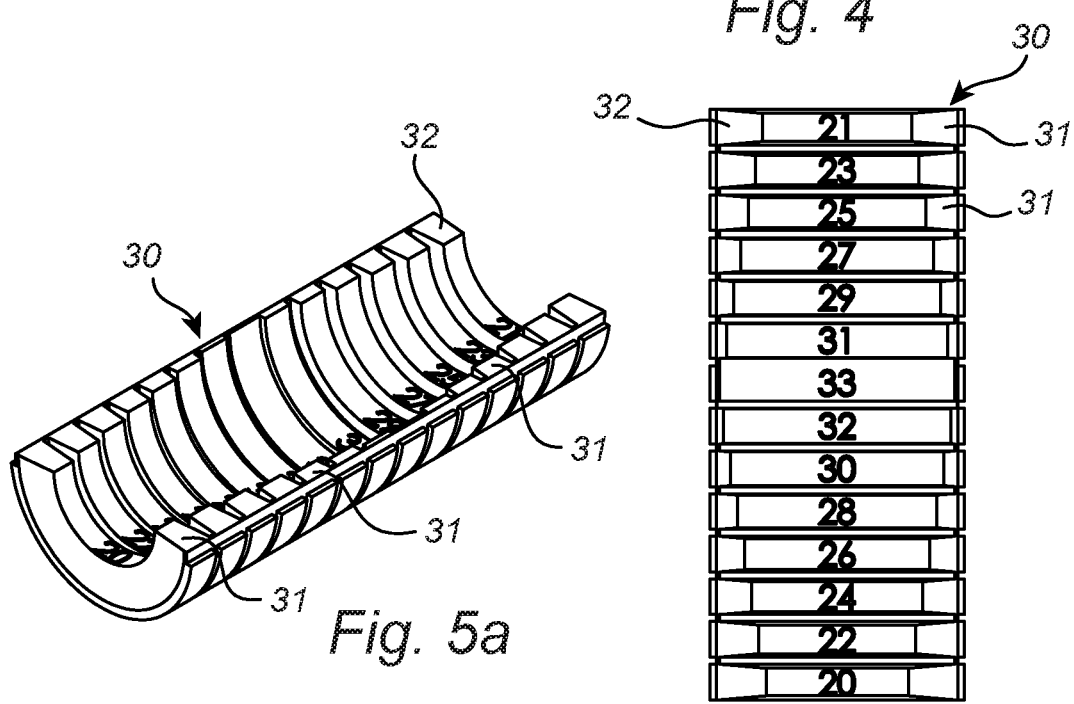
Fig. 5a
Fig. 5b

INSERT HALF, AND INSERT BLOCK COMPRISING TWO OF SAID INSERT HALVES

FIELD OF THE INVENTION

The present invention relates to an insert half for sealing around a cable, wire or pipe, and an insert block comprising two of said insert halves.

BACKGROUND OF THE INVENTION

Within many different technical fields, like for example merchant ships, offshore platforms and buildings with content of high importance there are several safety aspects that must be considered to avoid severe damages to the content within the structure as well as peoples working in, or close to, the area in case of accidents like for example fire or leaking water or gas from the outside or within the platform, ship or building.

In case of explosion, fire or leaking water the fire and/or leaking water and gas are often spread along wires, cables or pipes and in order to stop, or at least delay, the fire, water or gas from spreading within the structure, each cable, wire or pipe must be sealed where they are lead through partition walls within the platform, ship or building.

One frequently used sealing system that provide a reliable sealing of cables, wires or pipes extending through partition walls involves a metal frame permanently installed in the partition wall to provide a passage of a predetermined size for the cables, wires or pipes in the desired area of the partition wall. The cables, wires or pipes are during installation lead through the frame. The space within the frame is during installation of the sealing system filled with insert blocks packed in layers within the frame to completely fill the space within the frame. Each insert block consist of two insert block halves each provided with a semi-circular groove in one side of the block half such that a circular passage is formed through the insert block when the two block halves are put together. Each cable, wire or pipe extending through the frame is fitted in an insert block and packed within the frame. The outside dimensions of the insert blocks are selected so that a predetermined number of insert blocks have a size corresponding to the space within the frame. After the blocks are packed side by side in layers in the intended position a pressure applying device is arranged in the top part of the frame. The pressure applying device, upon activation, applies a pressure on the blocks to press the blocks together and provide the desired sealing around the cables, wires or pipes within the frame.

However, in order to achieve the desired sealing the diameter of the passage in the insert block must correspond to the diameter of the cable, wire or pipe. The desired tight fitting is either achieved by using a number of insert blocks with different diameters of the passage, or by an insert block with a larger passage and a number of peelable layers arranged in the groove such that a selected number of layers could be removed and the diameter of the passage adapted to each of the different cables, wires or pipes extending through the frame. Unfortunately this type of insert blocks generates a considerably amount of waste material.

There is consequently a need for an improved insert half, insert block, and sealing system, that ensures the desired sealing around the cable, wire of pipe and reduce the problems described above.

SUMMARY OF THE INVENTION

The present invention, defined in the appended claims, relates to a inset half, an insert block and the use of an insert block for sealing a cable, pipe or wire extending through a partition wall.

The insert half according to the invention comprises:
a body with a first and a second end, a first side intended to be arranged towards a corresponding first side of a substantially identical insert half, and a groove arranged in said first side and extending between the first and second end along an axis A, wherein a number of recesses extending substantially transverse to the axis A are formed in the groove along axis A; and
at least one insert removably arranged within said groove, said insert is formed by at least two elements bonded to each other and arranged side by side along axis A, said insert having an outside shape corresponding to the shape of the groove and the recesses such that the insert could be arranged anywhere along the groove, wherein each element comprises a semi-circular passage with different radius co-axial to axis A.

The general idée with the present invention is to use one insert half body in combination with at least one insert to adapt the insert half to cables, wires or pipes with different radius and thereby provide a reliable sealing around the periphery of the cable, wire or pipe.

The insert half according to the invention provides a flexible insert block half that could be used for sealing cables, wires or pipes with different diameters. During installation the insert is adapted to the specific diameter of the cable, wire or pipe by removing the elements that not correspond to the diameter of the cable, wire or pipe. i.e. elements with a semi-circular passage with a smaller radius than the cable, wire or pipe are removed in order to adapt the insert the cable, wire or pipe and provide the desired sealing around periphery of the cable, wire or pipe.

The insert half according to the invention is advantageous since the insert block half by providing an insert with a number of elements with a semi-circular passage with different radiuses corresponding to the mostly used dimensions of cables, wires or pipes.

In one embodiment of the insert half, the width of the recesses along axis A correspond to the width of the elements such that one element fit in one recess. This embodiment ensures that the insert is maintained in the intended position along axis A within the groove of the insert half.

In one embodiment of the insert half, the insert has a length along axis A that is less than half the length of the insert half along axis A. Preferably the insert block half has two inserts that both could be adapted to the cable, wire or pipe. The two inserts are arranged separated from each other along the groove, preferably close to the first and second end of the insert block body to provide a stable fitting around the cable, wire or pipe once pressure is applied to seal the space within the frame fitted in the partition wall.

In one embodiment of the insert half, the insert is formed by at least three elements each comprising a semi-circular passage with different radius, said at least three elements are removably bonded to each other and arranged side by side along axis A. An insert with higher number of elements increases the number of different diameters that the insert could be adapted to.

In one embodiment of the insert half, the at least one insert comprises at least four elements removably bonded to each other and arranged side by side along axis A, and each element comprises a semi-circular passage with different radius co-axial to axis A. An insert with higher number of elements increases the number of different diameters that the insert could be adapted to. Preferably the number of elements of each insert is half the number of recesses in the groove such to provide the maximum flexibility of insert block.

One embodiment of the insert half comprises two inserts arranged within said groove adjacent to the first and second end, each insert is formed by at least two elements removably bonded to each other and arranged side by side along axis A. The insert half has two inserts that both are adapted to the cable, wire or pipe to provide a sealing around the cable, wire or pipe at two locations to further improve the sealing. The two inserts arranged adjacent to the first and second end of the insert block body provide a stable fitting around the cable, wire or pipe which is favourable when pressure is applied to seal the space within the frame fitted in the partition wall. In one embodiment of the insert block, the groove has a substantially semi-cylindrical or rectangular shape along axis A, and the insert a corresponding semi-cylindrical or rectangular outside shape.

One embodiment of the insert half furthermore comprises a passage closing element with a shape corresponding to the radius of the different elements of the insert such that the passage is sealed, said passage closing element having a length along axis A not exceeding the length of the insert block half along axis A.

In one embodiment of the insert half, the at least two elements of the at least one insert have end surfaces arranged in the plane of the first surface of the insert block body. This embodiment is favourable since the end surfaces of the insert of one insert half must be in contact with the end surfaces of a corresponding insert half fitted around a cable, wire or pipe to provide the desired sealing.

In one embodiment of the insert half, the body has a semi-cylindrical or rectangular outside shape.

In one embodiment of the insert half, the comprises an insert comprising the same number of elements as the number of recesses in the groove arranged side by side, said elements have a semi-circular passage with different radius and are arranged such that the two elements with the largest radius are of the semi-circular passages are arranged in opposite ends of the insert, the element with the third largest radius is arranged adjacent to the element with the largest radius on the side of the element that is facing the element with the second largest radius, the element with the fourth largest radius is arranged adjacent to the element with the second largest radius on the side facing the element with the largest radius and the remaining elements arranged accordingly towards the centre of the insert. This embodiment is very favourable since the insert could be manufactured in one piece that is teared to form inserts adapted to a number of different cable, wire or pipe diameters.

The present invention furthermore relates to an insert block for sealing around a cable, pipe or wire comprising two insert block halves according to the definition above. The insert halves are arranged with the grooves and inserts facing each other such that a passage is formed through the insert block.

The present invention furthermore relates to the use of at least one insert half according to the definitions above in a metal frame fitted in a partition wall for sealing of at least one cable, pipe or wire extending through said partition wall.

The present invention furthermore relates to a sealing system for sealing around cables, wires or pipes extending through a partition wall, said system comprising:
  a frame arranged in the partition wall;
  at least one insert block according to claim 9 fitted around the cable, wire or pipe and arranged within the frame; and
  a pressure applying device arranged within the frame to apply a pressure on the at least one insert block to seal the space within the frame.

The different embodiment described above could of course be combined and modified in different ways without departing from the scope of the invention that will be described more in detail in the detailed description.

BRIEF DESCRIPTION OF THE DRAWINGS

Different embodiments of the insert block half according to the invention are illustrated in the appended figures.

FIG. 2 illustrates at perspective view of a sealing system comprising a circular frame.

FIGS. 3a and 3b illustrates a perspective view and top view of a first embodiment of an insert half body.

FIG. 4 illustrates an exploded view of a first embodiment of an insert half according to the invention.

FIGS. 5a and 5b illustrates a perspective view and top view of an insert according to the invention.

DETAILED DESCRIPTION

Figure 1:
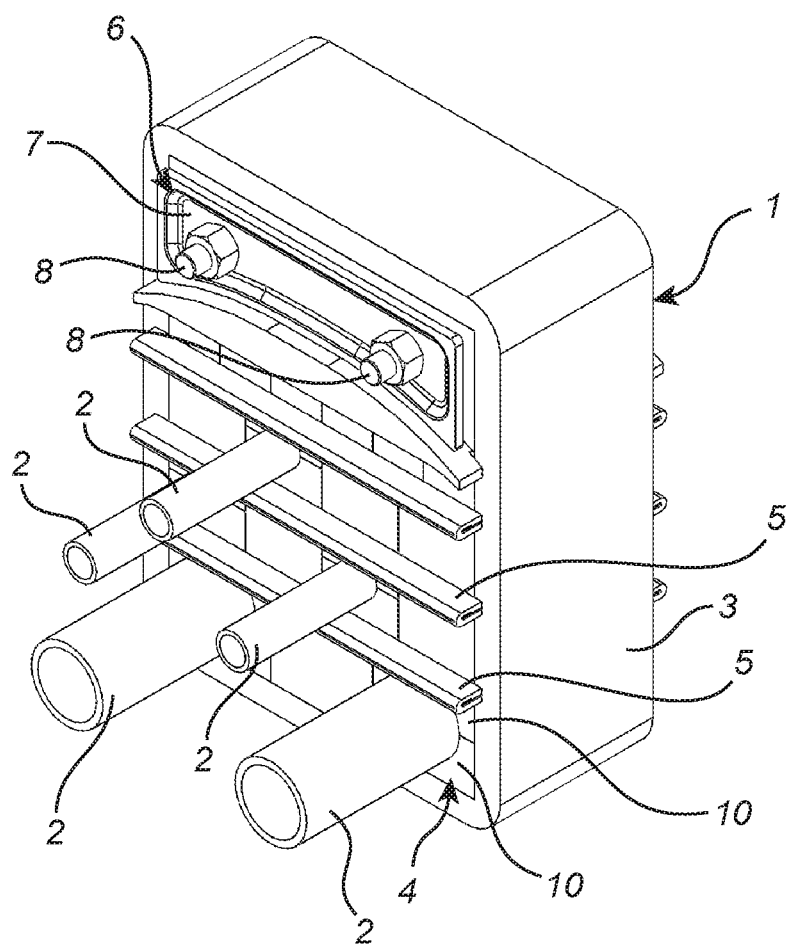
FIG. 1 illustrates at perspective view of a sealing system comprising a rectangular frame and insert halves and insert blocks according to the invention.

In FIG. 1 a sealing system 1 for sealing of cables 2, wires or pipes extending through a not illustrated partition wall is illustrated. The system involves a metal frame 3 intended to be permanently installed in the partition wall to provide a passage of a predetermined size in the partition wall. The cables, wires or pipes that need to pass through the partition wall are during installation lead through the frame.

In order to seal the space within the frame an insert block 4, comprising two substantially identical insert block halves 10, is fitted around each of the cables, wires or pipes extending through the frame. The insert blocks, and the cable, wire or pipe extending through the insert block, are packed in layers within the frame to completely fill the space within the frame. The insert blocks have substantially square cross sectional shape and the outside dimensions of the insert blocks are selected so that a predetermined number of insert blocks have a size corresponding to the space within the frame to fill the space within the frame and provide the desired sealing of the passage in the partition wall. The different layers of insert blocks are separated by a guiding metal plate 5 in order to ensure that the layers remain in the intended position within the frame 3 when pressure is applied on the sealing system. If the number of cables, wires or pipes is less than the number of insert blocks required to fill the space within the frame, the insert blocks could be replaced by a solid elastic rectangular block to fill the remaining spaces within the frame.

After the blocks are packed side by side in layers in the intended position within the frame a pressure applying device 6 is arranged in the top part of the frame. The pressure applying device comprises a plate 7 arranged on each side of an elastic member and threaded shafts 8 extending through the elastic member. When the elastic member is compressed between the plates by the shafts and nuts arranged on the shaft the elastic element expand such that a pressure is applied on the layer packed within the frame 3 thereby eliminating gaps between the insert blocks and sealing the space within the frame. Different types of pressure applying devices are available and the described device could be replaced by anyone of the available devices.

A second embodiment of a sealing system 100 is illustrated in FIG. 2. In this embodiment the rectangular frame is replaced by a circular metal frame 103 intended to be permanently installed in the partition wall. In this embodiment the pressure applying device 103 is arranged around the inner periphery of the frame. In the pressure applying device a rectangular opening 104 is formed for the insert block, or insert blocks, such that the pressure applying device is enclosing the insert block or insert blocks and cables. The above described insert blocks are fitted around the cables, wires and pipes and arranged within the opening in the pressure applying device such that the opening is filled completely before pressure is applied and the space within the frame is sealed.

Each insert block consists of two identical insert halves 10. Each insert half 10 comprises a rectangular body 11 illustrated in FIGS. 3*a* and 3*b*. The body 11 has a first end 12 and a second end 13 arranged on the opposite side of the rectangular body. In one of the substantially flat sides 14, extending from the first to the second end, a semi-cylindrical groove 15 is formed in the body such that a circular passage is generated through the insert block when two identical block halves are arranged together with the grooves 15 and flat sides 14 of each insert block half facing each other.

The longitudinal central axis A of the semi-cylindrical groove is arranged parallel to the flat side 14 of the body as well as coaxial with a longitudinal central axis of the insert block formed of two identical insert halves 10. The diameter of the semi-cylindrical groove is smaller than the width of the insert body so that an elongated contact surface 16 is formed along each side of the groove 15. The contact surfaces 16 of two adjacent insert block halves will be in contact with each other thereby enclosing the cable, wire or pipe arranged in the groove.

The body 11 is made of a pressure, water and heat resistant elastic rubber composition adapted to the specific demands on this type of sealing systems. The dimensions of the insert block half are preferably selected so that the insert block will have a square cross sectional shape but other shapes could be used as long at the size of the insert block corresponds to the dimensions of the frame in the partition wall.

Along the groove 15, a number of recesses 17 extending substantially transverse to the axis L are formed in the groove. In the illustrated embodiment the number of recesses is ten but the actual number could be both higher and smaller. All the recesses have the same width along the groove and a substantially uniform shape. The recesses are arranged side by side along the entire groove such that the groove will have an undulating shape.

The insert half furthermore comprises at least one insert intended to be arranged within the groove. The insert could be embodied in several different ways and different embodiments are illustrated in FIGS. 4, 5*a* and 5, 6*a* and 6*b* and 7.

The general idée with the present invention is to use type of insert half body in combination with at least one insert to adapt the size of the passage through the insert block formed of two insert halves to cables, wires or pipes with different radius and thereby provide a reliable sealing around cables, wires and pipes.

A first embodiment of the insert 20 is illustrate is illustrated in FIG. 4. The insert 20 is formed by at least two elements 21, i.e. the illustrated insert comprises three elements 21, bonded to each other and intended to be arranged side by side along axis A within the groove. Each element 11 has the shape of a half-circular arc with an outer peripheral shape and dimension corresponding to the shape and dimension of the recesses 17 such that the insert could be arranged and maintained in the groove anywhere along the groove. In each element of the insert a semi-circular passage co-axial to axis A is formed such that a circular passage is formed when to identical insert halves are fitted together with the grooves of the insert halves facing each other. In the end of each element an end surface 22 is formed. The end surface will be in contact with the end surface of a corresponding element of a second insert half.

The semi-circular passage of the different elements 21 have different radius such that different element will fit cables, wires or pipes with different radius. During the installation of the sealing system, the elements with a semi-circular passage not corresponding to the cable, wire or pipe are teared from the insert to adapt the insert to the particular cable, wire or pipe. Preferably, the insert always comprises two elements 21 since these inserts are maintained in an effective way within the groove which facilitates the installation of the sealing system. One of the elements is the one that correspond exactly to the present cable, wire or pipe and the second one the element that has a passage that is slightly larger than the present cable, wire or pipe.

Preferably each insert half comprises at least two inserts 20 arranged adjacent to the respective end surfaces of the insert half body to seal the cable, wire or pipe at two different locations along the cable, wire or pipe.

The number of elements of the insert is equal or less than the number of recesses in the insert body, i.e. in the illustrated embodiment the insert could include ten elements each having a semi-circular passage with different radius. The different elements of the inserts are bounded to each other side by side. The bounding is preferably thin to facilitate removal of adjacent elements to adapt the insert to the specific cable, wire or pipe.

A second favourable embodiment 30 of an insert is illustrated in FIGS. 5*a* and 5*b*. This embodiment of the insert comprises ten elements 31 arranged side by side. This insert extend along the entire groove. All ten elements have a semi-circular passage intended to fit cables, wire or pipes with different radius and as an example each element has been marked with numbers indicating which cable, wire or pipe diameter the element is intended to be used for.

The different elements 31 of the insert are arranged such that the two elements with the smallest radius of the semi-circular passages are arranged in opposite ends of the insert, the element with the third smallest radius is arranged adjacent to the element with the smallest radius on the side of the element that is facing the element with the second smallest radius, the element with the fourth smallest radius is arranged adjacent to the element with the second smallest radius on the side facing the element with the smallest radius and the remaining elements are arranged correspondingly in alternating ends of the insert adjacent to the elements with smaller radius.

During installation, the insert is torn to form two inserts that are arranged in each end of the groove to provide two sealing positions along the groove.

The genius design of the insert 30 comprising a number of elements arranged such that the two elements with adjacent radius of the semi-circular passage are arranged in alternating ends of the insert make it possible to tear the insert so that the element which will provide the perfect fit and the adjacent element could be arranged in one end the groove, and the element slightly larger and the thereto adjacent element are arranged in the opposite end of the groove. The sealing system formed by this insert half provide a reliable sealing around the cable, wire or pipe once pressure is applied by the pressure applying device since sealing is provided at two different positions along the cable, wire or pipe.

If the number of cables, wires or pipes extending through the partition wall is less than the number of insert blocks required to fill the space within the frame the insert half 10 furthermore comprises a passage closing element 40 intended to seal the passage through the insert block.

Figure 6A:
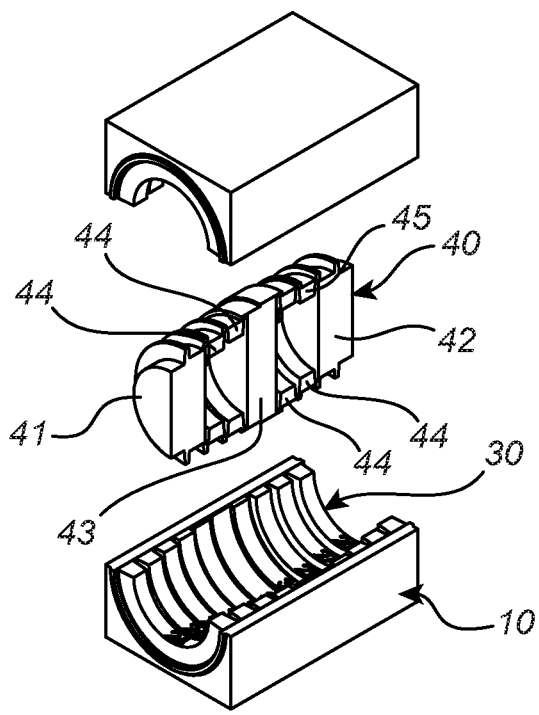
FIG. 6a illustrates an exploded view of an insert block comprising two insert halves and a passage closing element according to the invention.
Figure 6B:
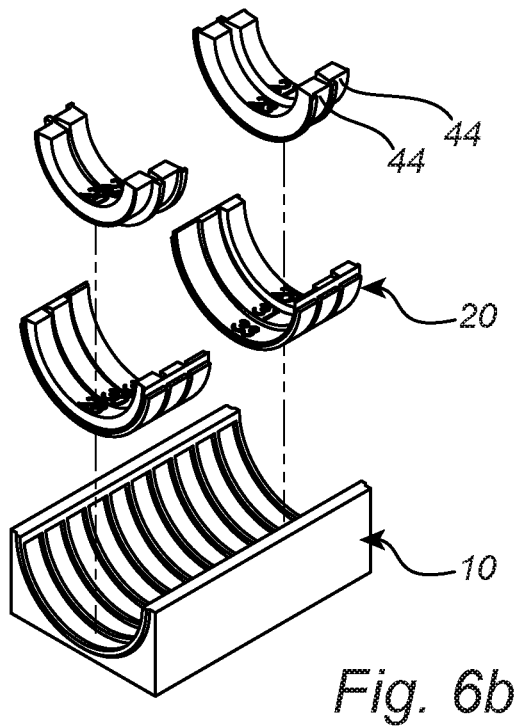
FIG. 6b illustrates an exploded perspective view of an insert half comprising four inserts.
Figure 6C:
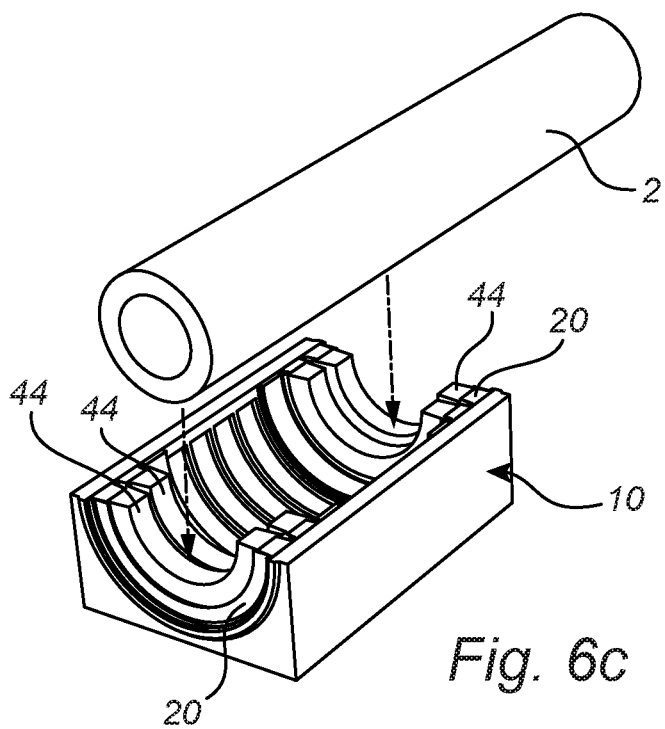
FIG. 6c illustrates a partially exploded perspective view of an insert half comprising four inserts and a cable.
Figure 6D:
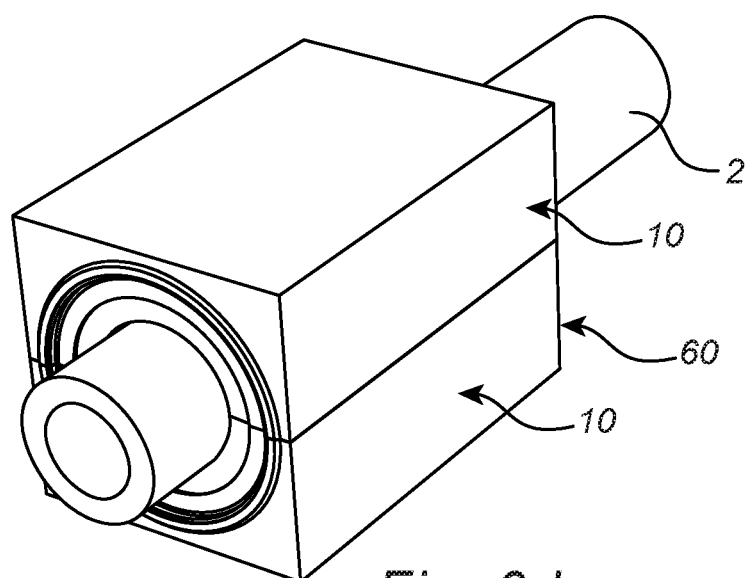
FIG. 6d illustrates a perspective view of two insert halves fitted around a cable.

One embodiment of the passage closing element 40 is illustrated in FIG. 6a. The passage closing element is intended to fill the space formed within the insert and has a substantially half circular cross sectional shape with different radiuses along the axis A in order to correspond to the radius of the different elements of the inserts.

The illustrated passage closing element 40 has a length along axis A corresponding to the length of the insert half along axis A. The length could however also be shorter than the length of the insert half. The illustrated passage closing element 40 is designed to fit with the insert illustrated in FIGS. 5a and 5b but could also be modified into a passage closing element designed with a circular cross sectional shape with different radius along axis A corresponding to the radius of the different elements of the insert.

The passage closing element 40 comprises a first 41 and a second end plug 42 arranged in opposite end of the passage closing element 40, a centrally arranged centre plug 43 and a two spacing elements arranged on each side of the centre plug 43 between the centre plug 43 and the first 41 and second end plug 42.

The two spacing elements 44 are designed as half-circular arcs with an outer peripheral shape and dimension corresponding to the shape and dimension of the passage in the insert at the corresponding position. The inner radius of the two spacing elements is selected such that the spacing elements could be used as second inserts intended to be arranged within the insert illustrated for example in FIG. 4 to further increase the flexibility of the inert half and the sealing system by further increasing the range in which the insert half is usable for sealing a cable, wire or pipe.

The spacing elements has a width along axis A corresponding to the width of the elements of the insert in order to provide a tight fit at the intended position within the insert. The passage closing element is preferably made as one piece that is easy to fit in the passage of the insert to seal the insert block. If the spacing elements are needed in order to adapt the insert half to the present cable, wire or pipe, the passage closing element is torn in order to free the spacing elements. The spacing elements are preferably arranged adjacent to each end surface of the insert half.

All embodiments of the inserts and passage closing elements are made of a pressure, water and heat resistant elastic rubber composition adapted to the specific demands on this type of sealing devices. The different embodiments of the inserts as well as the passage closing elements are preferably casted as one single piece with thin sections extending between the different elements of the inserts and the passage closing element in order to be easy to tear during installation of the sealing system.

In order to further increase the flexibility of the insert half the insert half body 11 is usable without any insert if the dimension of the present cable, wire or pipe corresponds to the radius of the groove.

Figure 7:
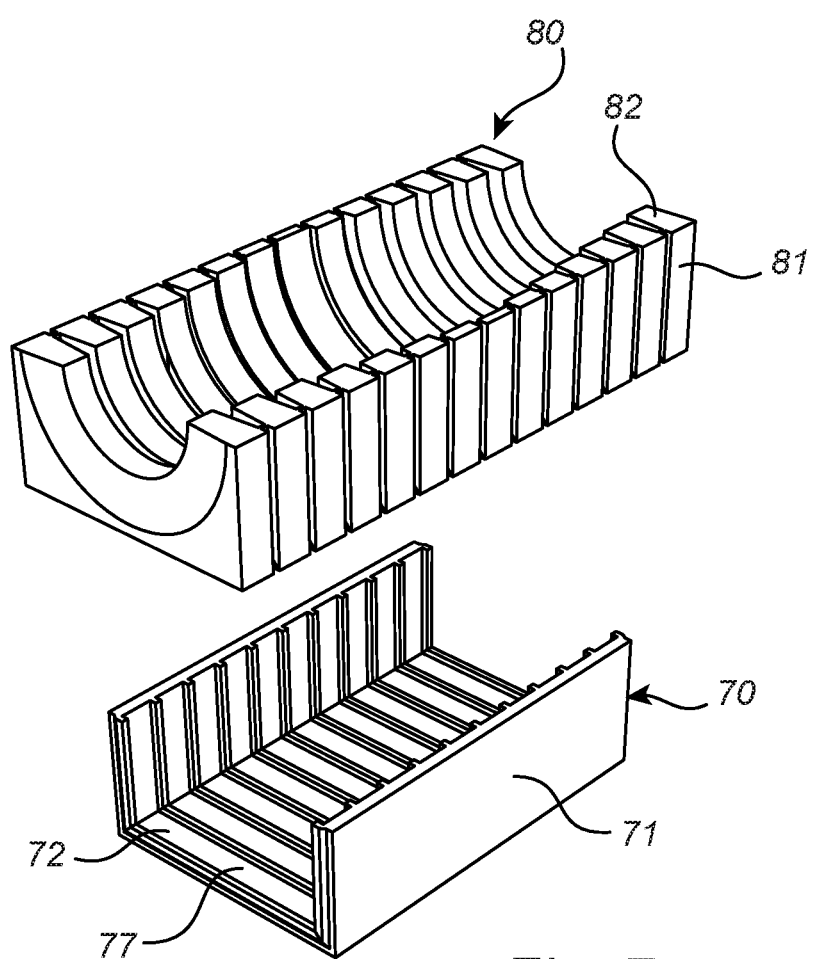
FIG. 7 illustrates a perspective view of a second embodiment of an insert half body and corresponding insert.

A further embodiment of the inset half 70 is illustrated in FIG. 7. The illustrated embodiment of the insert half comprises an insert half body 71 with the same dimensions and shape as the one described above. However, the semi-circular groove has been replaced by a substantially rectangular groove 72 formed in the insert half body. The groove has the dimension of a half square such that a square passage is formed through the insert block when two identical insert halves according to the present embodiment are arranged with the grooves facing each other. The width of the groove is smaller than the width of the body such that elongated contact surfaces are formed along each side of the groove. Along the groove a number of recesses 77 extending substantially transverse to the axis A are formed in the groove in the same way as in the previous embodiment where the recesses have the same width and uniform shape along the groove.

In this embodiment the insert half 70 comprises at least one insert 80 formed by at least two elements 81 arranged side by side. Each element has a rectangular peripheral shape and dimension corresponding to the shape of the groove 72 and recesses 77 in the insert half body such that the insert 80 could be arranged and maintained in the groove anywhere along the groove. Similar as in the previous embodiment a semi-circular passage co-axial to axis A is formed in the insert.

All the described embodiments intend to provide flexible insert block halves that together with a identical insert half are fitted around cables, wires or pipes with different diameters to ensure a reliable flexible sealing system that reduce the problems described in the background of the invention.

Furthermore, the embodiments described above could all be combined and modified in different ways without departing from the scope of the invention that is defined by the appended claims. For example the shape of the insert and the elements could be modified as long as the inserts and recesses in the groove correspond to each other and provide the desired sealing of the cables, wires and pipes extending through the frame in the partition wall.

The invention claimed is:

1. Insert half for sealing around a cable, pipe or wire, said insert half comprising:
   a body with a first and a second end, a first side intended to be arranged towards a corresponding first side of a substantially identical insert half, and a groove arranged in said first side and extending between the first and second end along an axis A, wherein a number of recesses extending substantially transverse to the axis A are formed in the groove along axis A; and
   at least one insert removably arranged within said groove, said insert is formed by at least two elements bonded to each other and arranged side by side along axis A, said insert having an outside shape corresponding to the shape of the groove and the recesses such that the insert could be arranged anywhere along the groove, wherein each element comprises a semi-circular passage with different radius co-axial to axis A.

2. The insert half according to claim 1, wherein the width of the recesses along axis A correspond to the width of the elements such that one element fit in one recess.

3. The insert half according to claim 1, wherein the insert has a length along axis A that is less than half the length of the insert half along axis A.

4. The insert half according to claim 1, wherein the insert is formed by at least three elements each comprising a semi-circular passage with different radius, said at least three elements are removably bonded to each other and arranged side by side along axis A.

5. The insert half according to claim 1, wherein the at least one insert comprises at least four elements removably bonded to each other and arranged side by side along axis A, and each element comprises a semi-circular passage with different radius co-axial to axis A.

6. The insert half according to claim 1, comprising two inserts arranged within said groove adjacent to the first and second end, each insert is formed by at least two elements removably bonded to each other and arranged side by side along axis A.

7. The insert half according to claim 1, wherein the groove has a substantially semi-cylindrical or rectangular cross-sectional shape along axis A, and the insert an corresponding semi-cylindrical or rectangular outside shape.

8. The insert half according to claim 1, furthermore comprising a passage closing element with a substantially semi-circular cross sectional shape with radius corresponding to the radius of the different elements of the insert such that the passage is sealed, said passage closing element having a length along axis A not exceeding the length of the insert block half along axis A.

9. The insert half according to claim 1, wherein said at least two elements of the at least one insert have end surfaces arranged in the plane of the first surface of the insert block body.

10. The insert half according to claim 1, wherein the body has a rectangular outside shape.

11. The insert half according to claim 1, comprises an insert comprising the same number of elements as the number of recesses in the groove arranged side by side, said elements have a semi-circular passage with different radius and are arranged such that the two elements with the smallest radius of the semi-circular passages are arranged in opposite ends of the insert, the element with the third smallest radius is arranged adjacent to the element with the smallest radius on the side of the element that is facing the element with the second smallest radius, the element with the fourth smallest radius is arranged adjacent to the element with the second smallest radius on the side facing the element with the smallest radius and the remaining elements arranged accordingly towards the centre of the insert.

12. Insert block for sealing around a cable, pipe or wire comprising two insert halves according to claim 1, said insert halves are arranged with the grooves and inserts facing each other such that a passage is formed through the insert block.

13. Use of at least one insert block according to claim 12 in a metal frame fitted in a partition wall for sealing of at least one cable, pipe or wire extending through said partition wall.

14. Sealing system for sealing around cables, wires or pipes extending through a partition wall, said system comprising:
   a frame arranged in the partition wall;
   at least one insert block according to claim 11 fitted around the cable, wire or pipe and arranged within the frame; and
   a pressure applying device arranged within the frame to apply a pressure on the at least one insert block to seal the space within the frame.

* * * * *